A. HARTMAN.
Assignor, by mesne assignments, to S. S. WHITE.
Dental-Drill.
No. 8,958. Reissued Nov. 4, 1879.
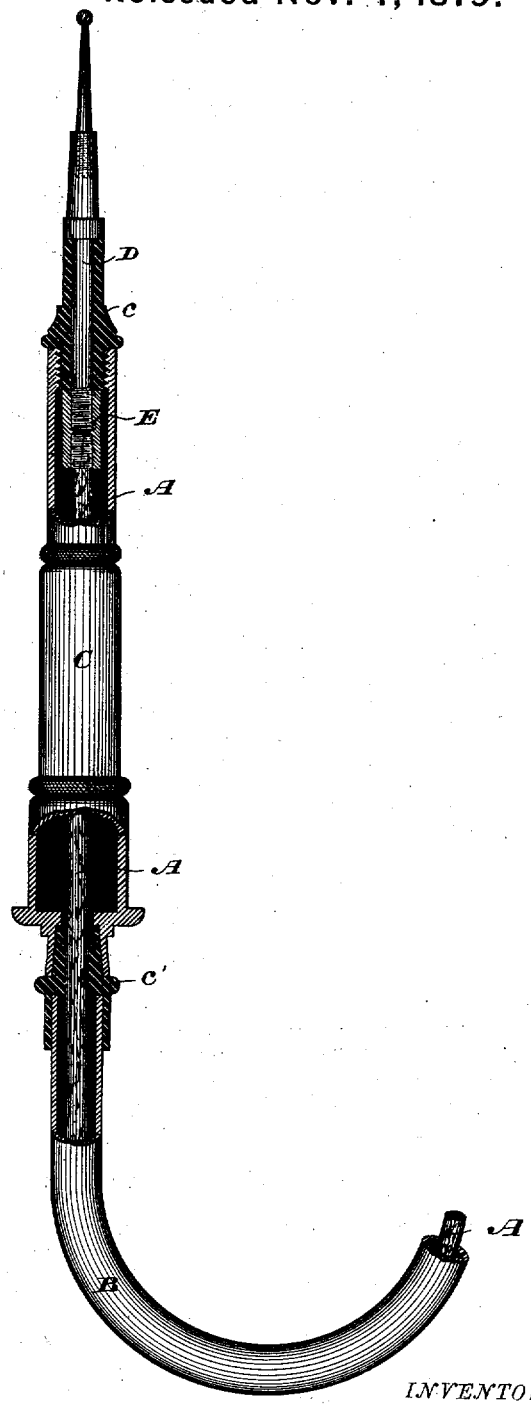
*WITNESSES*
Wm A Stinkle
Geo W Breck.
*By his Attorneys*
*INVENTOR*
Alexander Hartman
Baldwin, Hopkins & Peyton.
N. PETERS, PHOTO-LITHOGRAPHER, WASHINGTON, D. C.

UNITED STATES PATENT OFFICE.

ALEXANDER HARTMAN, OF MURFREESBOROUGH, TENNESSEE, ASSIGNOR, BY MESNE ASSIGNMENTS, TO SAMUEL S. WHITE, OF PHILADELPHIA, PA.

IMPROVEMENT IN DENTAL DRILLS.

Specification forming part of Letters Patent No. 118,237, dated August 22, 1871; Reissue No. 8,231, dated May 14, 1878; Reissue No. 8,958, dated November 4, 1879; application filed January 23, 1879.

*To all whom it may concern:*

Be it known that I, ALEXANDER HARTMAN, of Murfreesborough, in the county of Rutherford and State of Tennessee, have invented certain new and useful Improvements in Dental Instruments for Drilling and other Purposes, of which the following is a specification.

My invention relates more especially to that class of said instruments in which rotary motion is given to a tool holder or chuck mounted in a hand piece or casing through the medium of a flexible shaft, the hand-piece being connected with a flexible sheath or cover, which envelops and protects the driving-shaft, which class is now generally called "dental engines."

The objects of my invention are to obviate objections incident to such instruments as heretofore constructed, and to provide a hand-piece in which the tool-holder will revolve steadily and without wabbling or endwise movement, and in which ready access may be had to the tool-holder, to the interior of the casing in which the tool-holder rotates, to the bearings of the casing, and to the connections between the tool-holder and its driving-shaft.

To these ends my invention consists, first, in constructing the hand-piece casing of straight separable sections, having tubular bearings at its opposite ends, and mounting therein a spindle tool holder or chuck; secondly, in combining a hand-piece thus constructed with a flexible driving-shaft connected with the rear or butt end of the tool-holder to turn it; thirdly, in combining such a hand-piece with a flexible driving-shaft connected with the butt-end of the tool-holder and an enveloping sheath or cover for the shaft connected with the butt-end of the casing; fourthly, in providing the hand-piece casing with a detachable nose or sleeve constituting one of its sections, so that when too much worn by the rapid rotation of the tool-holder or tool therein the nose may be replaced by a new one, thereby obviating the necessity of substituting an entirely new hand-piece; and, fifthly, my invention consists in providing the butt-end of the tool-holder with a screw coupling or socket, to connect it and the flexible shaft and the hand-piece casing with a socket at the butt-end, to connect it and the flexible sheath.

The accompanying drawing represents a vertical elevation, partly in section, of what I believed to be the best mode of embodying my improvements at the date of the application for my original patent.

The principal devices represented in the said drawing are the driving-shaft or connection A, the tube B, covering the said shaft and forming a flexible sheath therefor, the hand-piece casing C *c c'*, the spindle tool-holder D, and the dental drill F. The flexible shaft (represented in the drawing as the connection for transmitting a revolving motion to the tool-holder) is made of rattan; but it may be any other suitable connection; and I am aware that coiled wire and catgut have been used as a flexible connection for such purposes. The tube B (represented in the drawings) is a rubber tube. It covers the flexible connection or shaft, and, being made of a flexible material, forms a flexible sheath for the flexible shaft.

The hand-piece casing represented in the drawing is constructed of straight tubular detachable sections—viz., the handle-section C and an end section, nose, or sleeve, *c*, connected together by screw-threads—and, although rigidly connected for use, they are readily detachable. The inner or butt end of the handle-section is detachably connected by means of a tubular bearing, *c'*, (which constitutes the rear tubular bearing of the hand-piece,) with the outer end of the flexible sheath B, that surrounds and protects the flexible driving-shaft. This tubular bearing *c'* is secured to the flexible sheath, being provided with a socket, in which the end of the sheath is inserted and fastened in any suitable manner. This permits of a neat and strong joint being secured between the hand-piece and sheath. The inner or butt end of the handle-section of the casing is shown as slipped upon the tapering surface of the said tubular bearing and held by friction.

In this sectional tubular casing is mounted a spindle tool holder or chuck, D, constructed to revolve on its longitudinal axis in the sleeve or nose *c*, which thus forms a bearing for the tool-holder. The latter is also provided, outside the casing, with a collar, which bears against the front end of the nose, as a push-bearing, so that the inward endwise movement of said tool-holder is prevented. The butt-end of this tool-holder is firmly connected with the outer end of the flexible shaft A by means of a screw-coupling, socket, or nut, E, into which the end of the shaft is inserted and secured. This nut permits of the ready and firm connection of the shaft and tool-holder, or their disconnection, when desired, and, in addition, constitutes an internal shoulder or pull-bearing for the tool-holder, the shoulder abutting against the inner end of the nose or sleeve *c* in such manner as to prevent endwise movement of the tool-holder in an outward direction.

It will thus be seen that the hand-piece casing is provided with tubular bearings at its opposite ends, which insure the steady working of the operating-tool, while the tubular sections, constituting the casing, are readily detachable to permit of inspecting the tool-holder, its bearings, and the interior of the casing; that the tool-holder chuck is locked from endwise movement in the casing, and that the flexible connection or shaft and its flexible covering-tube or sheath permit of a wide range of movement of the hand-piece and operating-tool, which enables the tool to be guided and operated in all directions with advantage, the flexure of the shaft and sheath not interrupting the free transmission of the driving-power.

I am enabled, by the construction of hand-piece casing shown and described, to remove the nose thereof when too much worn, and replace it by a new one, thereby obviating the necessity of substituting an entirely new hand-piece when the bearings of the tool-holder become worn by the excessive friction to which they are subjected, owing greatly to the pressure upon the operating-tools when at work.

I am aware that Greene V. Black's patent, No. 117,732, of August 8, 1871, shows a hand-piece casing composed of a single tube, in which a rotary chuck is mounted and locked against endwise movement, the tube or casing being inserted in an extension of a jointed yoke, and held therein by friction, within which yoke a driving-spring rotates to impart rotary motion to the chuck; but this construction obviously differs radically from my invention, as Black has no detachable sections to permit of readily inspecting the interior of the casing and the tool-holder, nor does he show or describe the tubular bearings at the opposite ends of the hand-piece, as in my invention.

I am also aware that a dental-engine hand-piece casing composed of a single tube, within which is mounted a rotary chuck, and upon which tube is mounted a supplementary angle attachment carrying an operating-tool, is old, such a device being shown in English Letters Patent No. 529 of 1856 and in United States Letters Patent No. 106,498, of 1870. These devices differ radically and essentially from and have no relation to my invention, and are not sectional hand-pieces in the sense in which I use that term, because the removal of the angle attachment does not afford access to the tool-chuck, to the interior of the hand-piece, or to tubular bearings at opposite ends of the casing.

I wish it to be understood, also, that I do not claim, broadly, every sectional hand-piece casing in which is mounted a tool-holder, as a construction that would be embodied in such a claim is very old.

I claim as my invention—

1. The combination, substantially as hereinbefore set forth, of a spindle tool holder or chuck with a straight hand-piece casing constructed of detachable sections and having tubular bearings at its opposite ends.

2. The combination, substantially as hereinbefore set forth, of a flexible driving-shaft, a spindle tool holder or chuck, and a straight hand-piece casing constructed of detachable sections and having tubular bearings at its opposite ends.

3. The combination, substantially as he inbefore set forth, of the spindle tool-holder, the flexible driving-shaft connected therewith, the straight hand-piece casing constructed of detachable sections and having tubular bearings at its opposite ends, and a flexible sheath connected with the butt of said casing.

4. A hand-piece casing consisting of a handle-section or main portion and a detachable nose or section, the two being connected by screw-threads, whereby the nose in which the rotary tool holder or chuck has its bearings, although rigidly connected with the handle-section for use, may, when worn, be readily removed and a new one substituted in its place.

5. The combination, substantially as hereinbefore set forth, of the tubular sectional hand-piece casing provided with a socket by which to connect the casing and flexible sheath and the spindle tool-holder provided with a screw-coupling or socket by which to connect the tool-holder and flexible driving-shaft.

6. The combination, substantially as hereinbefore set forth, of the spindle tool-holder, the flexible shaft, the screw-coupling, the tubular sectional hand-piece casing, and the flexible sheath for the said shaft.

ALEXANDER HARTMAN.

Witnesses:
W. N. DOUGHTY,
H. C. WRIGHT.